UNITED STATES PATENT OFFICE.

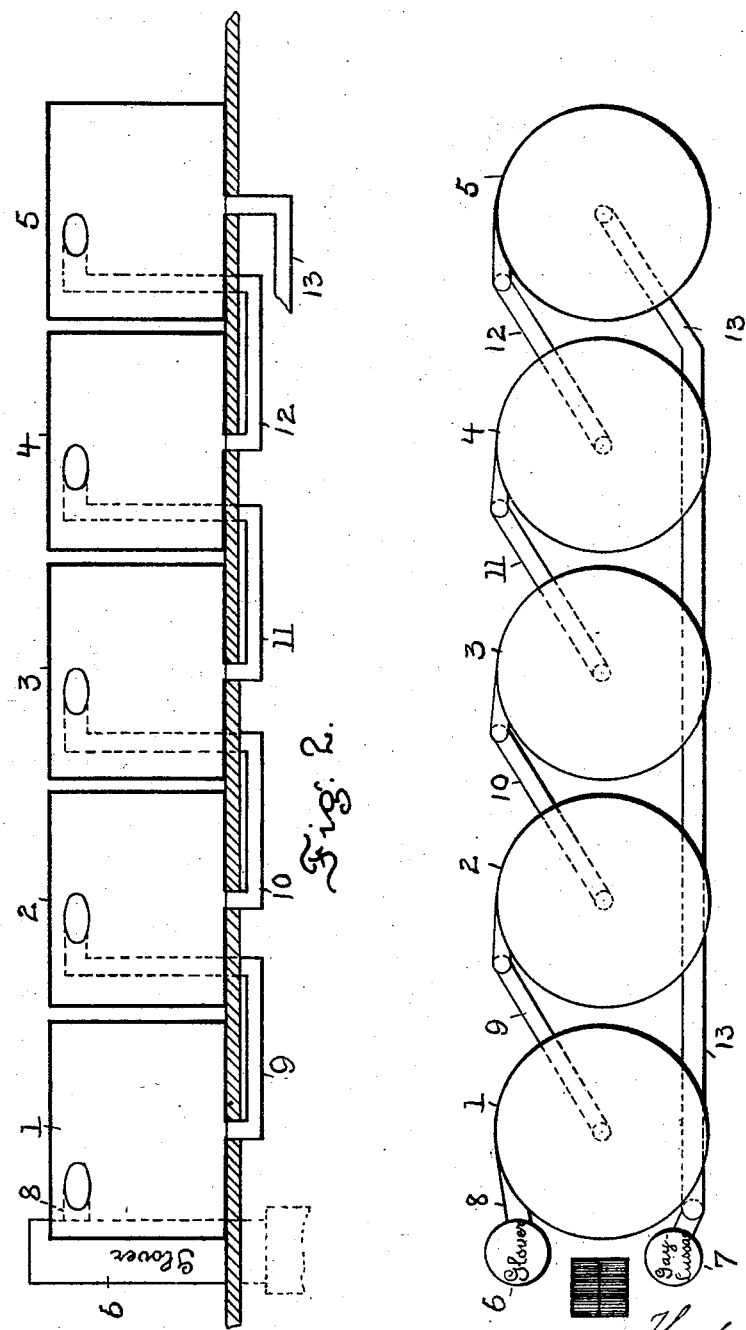

THEODOR MEYER, OF OFFENBACH, GERMANY, ASSIGNOR OF ONE-HALF TO CHARLES GLASER, OF BALTIMORE, MARYLAND.

APPARATUS FOR MAKING SULFURIC ACID.

SPECIFICATION forming part of Letters Patent No. 688,538, dated December 10, 1901.

Application filed February 16, 1901. Serial No. 47,608. (No model.)

*To all whom it may concern:*

Be it known that I, THEODOR MEYER, a subject of the Emperor of Germany, and a resident of Offenbach, Germany, have invented certain new and useful Improvements in Chambers for the Manufacture of Sulfuric Acid, of which the following is a specification.

In the condensing-chambers usually employed in the manufacture of sulfuric acid, in which the gas from which the acid is to be made is forced to pass through said chambers by the shortest path, the movement of the vapors through the chambers is in great measure rectilinear and but slightly modified by the cooling action of the walls. The reaction of the gases upon one another, by which acid is formed, takes place principally when the gases are brought into intimate association with one another, and in the old form of chambers the reaction took place principally at the inlets and outlets of chambers which were not provided with obstructions, and in chambers which were provided with obstructions the reactions took place largely at the points of obstruction. The first of these forms was costly and slow of operation, besides which it concentrated the high temperature produced by the chemical reaction at circumscribed and objectionable points. In the latter class the apparatus was expensive and they were not, as a rule, provided with any means for reducing the temperature of the gases.

This invention relates to a novel construction by which it is attempted to overcome these objections by constructing a simple and comparatively cheap apparatus in which the gases by being introduced tangentially into a circular chamber are caused to travel in a helical and volute course, whereby they will move a maximum distance and are intimately mixed and active chemical reaction is thereby produced, while the gases are cooled by forcing them into contact with the walls of the chamber and causing them to travel around and around in contact with the walls of the chamber, and finally to gather in the center and by gravity sink down into the vortex of the moving gases and escape from the chamber at the center of its bottom and from there be carried to a succeeding chamber to repeat the same operation. The chambers may be circular or polygonal in cross-section.

In the accompanying drawings my invention is diagrammatically illustrated.

Figure 1 shows an elevation of a plurality of chambers connected together by pipes. Fig. 2 shows a plan of the same.

Referring to the drawings, 1, 2, 3, 4, and 5 are a series of circular acid-chambers, 6 is a Glover tower, and 7 a Gay-Lussac tower. The Glover tower is connected with chamber 1 by a pipe 8, which enters chamber 1 at the side near the top and tangentially. 9 is an exit-pipe connected to the chamber 1 at the center of its bottom and to the chamber 2 at its side near the top and tangentially in manner similar to pipe 8 and chamber 1. Pipe 10 leaves chamber 2 at the center of its bottom and enters the top of chamber 3 at the top of its side tangentially. Pipe 11 leaves chamber 3 and enters 4 in the same manner. Pipe 12 leaves chamber 4 and enters chamber 5 in the same manner, and pipe 13 leaves the center of the bottom of chamber 5 and enters the Gay-Lussac tower.

Any number of chambers may be used which experience dictates.

The operation is as follows: When the gases enter chamber 1 by pipe 8 from the Glover tower, they travel in a helical path around and around the chamber in contact with the walls, and the circle of their travel gradually grows less and less as they describe a volute curve in the chamber until they reach the center, where the gases which have been longest in the chamber, being the coolest and most dense, will sink and escape by the pipe 9 from the center of the bottom. This action would not take place but for the cooling action of the walls of the chamber. As the gases travel around and around in the chamber chemical union will take place, with a considerable increase in temperature, and unless the gases were cooled they would not only have to be drawn off from the top of the chamber, but the extremely high temperature would interfere with the economical production of acid; but the repeated contact of the gases with the cooling-walls of the chamber, as they travel around and around in contact with them, will so reduce the temperature as to accelerate the production of acid and reduce the temperature of the gases, so that they will fall in the center of the chamber and escape from the bottom and not from the top. The path of travel of the gases as they progress around and around the chamber will be so long that a very intimate mixture of them will result and a high production of acid. Hence a low cost in chambers, which may be made smaller per unit of capacity.

Having now described my invention, what I claim, and desire to secure by Letters Patent, is—

In a sulfuric-acid apparatus the combination of a series of circular or substantially circular chambers connected by pipes, each chamber having a single inlet-pipe, and a single outlet-pipe, the single inlet-pipe of each chamber entering it at the side near the top only and tangentially, and the single outlet-pipe descending and leaving said chamber from the center of the bottom, whereby gases are admitted at the top of the chamber, permitted to rotate in the chamber, and as they cool and descend, drawn off from the center of the bottom of the chamber in a downward direction, substantially as described.

Signed by me at Frankfort-on-the-Main, Germany, this 16th day of January, 1901.

THEODOR MEYER.

Witnesses:
JEAN GRUND,
CARL GRUND.